United States Patent [19]

Craig

[11] Patent Number: 4,670,505

[45] Date of Patent: Jun. 2, 1987

[54] POLYACRYLATE DISPERSIONS

[75] Inventor: Daniel H. Craig, Hockessin, Del.

[73] Assignee: Hercules Incorporated, Wilmington, Del.

[21] Appl. No.: 768,273

[22] Filed: Aug. 23, 1985

[51] Int. Cl.[4] .................. C08L 33/00; C08L 33/04; C08L 33/08; C08L 33/010

[52] U.S. Cl. .................. 524/704; 524/732; 524/733; 524/734; 524/755

[58] Field of Search ............ 524/700, 704, 726, 732, 524/733, 734, 755

[56] References Cited

U.S. PATENT DOCUMENTS

| | | | |
|---|---|---|---|
| 3,876,596 | 4/1976 | Grubert et al. | 524/733 |
| 4,089,828 | 5/1978 | Vasishth et al. | 524/833 |
| 4,265,796 | 5/1981 | Mueller-Mall et al. | 524/510 |
| 4,296,225 | 10/1981 | Rhum | 524/816 |

FOREIGN PATENT DOCUMENTS 1278813  6/1972  United Kingdom .

Primary Examiner—John Kight
Assistant Examiner—Nathan M. Nutter
Attorney, Agent, or Firm—Joanne L. Horn

[57] ABSTRACT

Disclosed are aqueous polyacrylate dispersions having improved rheological and stability characteristics prepared by the emulsion polymerization of acrylic esters, methacrylic esters and mixtures thereof in the presence of, by weight of the total monomer content, (a) from about 0.1 to 5% of at least one water-soluble amino alcohol compound and (b) from about 0.05 to about 5% of at least one protective colloid. The resultant aqueous polyacrylate dispersions are useful in the manufacture of latex paints, binders for nonwoven materials, water-based inks, paper coatings and water-borne adhesives, such as pressure-sensitive adhesives.

14 Claims, No Drawings

POLYACRYLATE DISPERSIONS

This invention relates to aqueous polyacrylate dispersions having improved rheological and stability characteristics and processes for their preparation. The aqueous polyacrylate dispersions are useful in the manufacture of latex paints, binders for nonwoven materials, water-based inks, paper coatings and water-borne adhesives, such as pressure-sensitive adhesives.

It is known that the presence of protective colloids, such as hydroxyethylcellulose (HEC) and polyvinyl alcohol, in the emulsion polymerization of acrylic esters, methacrylic esters or mixtures thereof together with at least 50% vinyl acetate, by weight of the total monomer, provides latices having good mechanical stability and viscosity control. However, when the vinyl acetate comonomer is not used or is used in amounts less that 50%, a stable latex cannot be obtained if the protective colloid is present.

Further, it is known that the presence of protective colloids during the manufacture of polyacrylate dispersions or latices from reaction mixtures having a high acrylate or methacrylate content usually results either in coagulated dispersions or in extremely viscous dispersions which are unsuitable for use as paint binders or any other use.

Thus, in order to provide acrylic latices having the improved stability which results from the successful incorporation of protective colloids during the emulsion polymerization of acrylic or methacrylic monomers, a number of methods have been developed. For example, British Patent No. 1,278,813 discloses the use of emulsion stabilizers, such as allyl alcohols, allyl halides and low molecular weight aliphatic alcohols; whereas U.S. Pat. No. 4,265,796 teaches the use of molecular weight regulators, such as mercaptoacetic acid and cyclohexylamine, to permit the inclusion of protective colloids in the manufacture of polyacrylate dispersions.

Other processes provide for the gradual addition of the protective colloid during the polymerization reaction (see, e.g., U.S. Pat. No. 3,876,596). The resultant latices, however, have a high viscosity, coarse particle size and poor processing characteristics.

The use of high levels of surfactants, e.g., about 5% to about 10%, based on the monomer, in place of the protective colloid has also been used to obviate the problems associated with the emulsion polymerization of acrylic esters and methacrylic esters in the presence of a protective colloid. However, the properties of the resultant latex, such as its film-forming ability, tensile strength, film-blocking resistance and water and solvent resistance are adversely affected.

This invention provides a method for successfully incorporating the protective colloid in acrylic ester and methacrylic ester latices without particle agglomeration which does not require the presence of high surfactant levels during their preparation. The polyacrylate latices of this invention are low viscosity, shear stable, essentially grit free and reproducible and exhibit improved pigment binding.

In accordance with this invention, it has been found that protective colloids are readily and successfully incorporated in polyacrylate dispersions by the emulsion polymerization of acrylic esters, methacrylic esters and mixtures thereof in the presence of, by weight of total monomer content, (a) from about 0.1 to 5% of at least one water-soluble amino alcohol, as hereinafter defined, and (b) from about 0.05 to about 5% of at least one protective colloid. The resultant latices are low viscosity, essentially grit free, and shear stable. Latex paints formulated with these latices exhibit good abrasion resistance.

Acrylic esters and methacrylic esters suitable for use in the practice of this invention include alkyl acrylates and methacrylates wherein the alkyl group contains less than 10 carbon atoms. Typical acrylic esters and methacrylic esters include methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, t-butyl acrylate, t-butyl methacrylate, 3,3-dimethylbutyl acrylate and 3,3-dimethyl butyl methacrylate. These monomers can be homopolymerized or copolymerized with each other.

In addition to being copolymerized with each other, the aforementioned acrylates and methacrylates can be copolymerized with one or more different monomers capable of addition type polymerization, including styrene, $C_{10\text{-}22}$ alkyl acrylates, $C_{10\text{-}22}$ alkyl methacrylates, acrylic or methacrylic acid, vinyl and vinylidene halides, allyl esters of saturated monocarboxylic acids, vinyl esters, vinyl ethers, dialkyl esters of monoethylenically unsaturated dicarboxylic acids, ethylenically unsaturated monocarboxylic and polycarboxylic acids and the anhydrides, nitriles, unsubstituted and substituted (including n-substituted) amides of all said acids.

Suitable $C_{10\text{-}22}$ alkyl esters of acrylic and methacrylic acid include decyl acrylate, decyl methacrylate, hendecanyl methacrylate, lauryl methacrylate, tridecanyl methacrylate, myristyl acrylate, myristyl methacrylate, pentadecanyl methacrylate, arachidyl methacrylate, behenyl methacrylate, 10-methyl hendecanyl methacrylate and 2-ethyllauryl methacrylate.

Suitable vinyl esters include aliphatic vinyl esters, such as vinyl formate, vinyl acetate, vinyl propionate, vinyl butyrate, vinyl isobutyrate, vinyl valerate, and vinyl caproate, and suitable allyl esters of saturated monocarboxylic acids, such as, allyl acetate, allyl propionate and allyl lactate. Generally, these monomers are used in amounts ranging up to about 10% by weight of the total weight of monomers used. The allyl esters of saturated monocarboxylic acids are generally used in relatively small amounts together with larger amounts of one or more different vinyl monomers, particularly with aliphatic vinyl esters such as vinyl acetate.

Typical vinyl ethers include methylvinyl ether, ethylvinyl ether and n-butylvinyl ether and typical vinyl ketones include methylvinyl ketone, ethylvinyl ketone and iso-butylvinyl ketone. Suitable dialkyl esters of monoethylenically unsaturated dicarboxylic acids include diethyl maleate, dibutyl maleate, dioctyl maleate, diisooctyl maleate, dinonyl maleate, diisodecyl maleate, ditridecyl maleate, dipropyl fumarate, dibutyl fumarate, dioctyl fumarate, diisooctyl fumarate, didecyl fumarate, dibutyl itaconate and dioctyl itaconate.

Monoethylenically unsaturated monocarboxylic acids, such as acrylic acid, methacrylic acid, ethacrylic acid and crotonic acid; monoethylenically unsaturated dicarboxylic acids, such as maleic acid, fumaric acid, itaconic acid and citraconic acid; and monoethylenically unsaturated tricarboxylic acids, such as aconitic acid and the halogen-substituted derivatives, e.g., alpha-chloroacrylic acid, and anhydrides of these acids, such as, e.g., maleic anhydride and citraconic anhydride are suitable for use as comonomers in the practice of this invention.

Acrylonitrile, alpha-chloro-acrylonitrile and methacrylonitrile are among the corresponding nitriles of such acids which can be used as comonomers. Suitable amides of such acids include unsubstituted amides such as acrylamide, methacrylamide and other alpha-substituted acrylamides and n-substituted amides obtained by conventional reaction of the amides of the aforementioned mono- and poly-carboxylic acids with an aldehyde, such as formaldehyde. Typical n-substituted amides include n-methylolacrylamide, n-methylolmethacrylamide, alkylated n-methylolacrylamides and n-methylolmethacrylamides such as n-methoxymethylacrylamide and n-methoxymethylmethacrylamide.

Amino monomers which can be used in the practice of this invention include substituted and unsubstituted aminoalkyl acrylates, hydrohalide acid salts of amino monomers and methacrylates, such as beta-aminoethylacrylate, beta-aminoethylmethacrylate, dimethylaminomethylacrylate, beta-dimethylaminoethylacrylate, dimethylaminomethylmethacrylate. Typical hydroxy-containing monomers include beta-hydroxyethylacrylate, beta-hydroxypropylacrylate, gamma-hydroxypropylacrylate and beta-hydroxyethylmethacrylate.

Typically, the comonomer is present in an amount from about 0.5% to about 25%, by weight of the total monomer content, preferably from about 0.5% to about 10%, most preferably from about 1% to about 5%.

The amino alcohols useful in the practice of this invention include any water-soluble amino alcohol compound, both saturated and unsaturated, having from 2 to 36 carbon atoms, rosin amines, the alkylene oxide polycondensates derived therefrom, and the inorganic and organic acid salts thereof. Typically the moles of alkylene oxide present in the amino alcohol compound is from 4 to 20. Surface active and nonsurface active aliphatic amino alcohols can be used provided they are water-soluble and have at least one amino and at least one alcohol functional group. The amino alcohol may have more than one amino group and more than one alcohol group. The amino group may be primary, secondary or tertiary.

Typical non-surface active amino alcohols include mono, di, and trialkoxylated aliphatic amines, such as triethanolamine, and the higher alkoxylates thereof, amino alcohols whereby the amine and alcohol functionalities are separated by more than 2 methylene carbons, such as 3-amino-1-propanol, 4-amino-1-butanol, 5-amino-1-pentanol, etc. and various alkylene oxide adducts thereof.

Suitable surface-active amino alcohols include alkoxylated fatty amines wherein the fatty amine moiety has from 8 to 22 carbon atoms and alkoxylated rosin amines.

The water-soluble amino alcohols are used at very low levels. Generally, for nonsurface-active amino alcohol compounds, the amount is from about 0.1 to 5%, by weight of the total monomer content, preferably from about 0.1 to about 2%, and most preferably from about 0.5 to about 1%. When the water-soluble amino alcohol compound is a surface-active compound, such as a polyalkoxylated rosin amine, higher levels may be used since such surface-active amino alcohols can also function as a surfactant at the higher levels. When the surface-active amino alcohol is to function as both the stabilizing additive and as the surfactant, preferably 1% to about 5% of the surface-active amino alcohol compound is used, most preferably 1% to about 3%.

The resultant polyacrylate dispersions impart significant improvement to the wet-abrasion resistance of latex paints formulated with them.

Typical protective colloids include hydroxyethyl cellulose, ethylhydroxyethyl cellulose, carboxymethyl cellulose, ethoxylated starch derivatives, partially and fully hydrolyzed polyvinyl alcohols, polyacrylic acid, sodium and other alkali metal polyacrylates, polyacrylamide, poly(methylvinyl ether-maleic anhydride), polyvinylpyrrolidone, water-soluble starch, glue, gelatin, water-soluble alginates, such as sodium or potassium alginate, casein, agar and natural and synthetic gums, such as gum arabic and gum tragacanth.

Although the amount of protective colloid used will vary depending on the desired viscosity, particle size and latex properties, generally from about 0.05 to about 5%, by weight of the total monomer content, is employed, preferably from about 0.2% to about 1%. The amount useful in a particular addition polymerization reaction to obtain the viscosity, particle size and latex properties desired is well within the knowledge of those skilled in the art.

Anionic, cationic, nonionic and amphoteric emulsifiers and mixtures thereof known in the art may be used in the practice of this invention; or completely omitted if higher levels of surface-active amino alcohol compounds are used.

Suitable emulsifiers include polyglycol ethers, sulfonated paraffin hydrocarbons, higher alkyl sulfates such as lauryl sulfate, alkali metal salts of fatty acids such as sodium stearate and sodium oleate, sulfuric acid esters of fatty alcohols, ethoxylated $C_{4-12}$ alkyl phenols and their sulfonation products and also sulfosuccinic acid esters in amounts usually of from 0.1 to 5.0% by weight based on the monomers. Any known methods of emulsion polymerization may be used, including batch, semi-batch, continuous or redox techniques. Semi-batch monomer addition, other than the water-soluble amino alcohol compounds, with either batch or continuous addition of the initiator concomitant with the delayed addition of monomer, other than the water-soluble amino alcohol compound, is preferred. Preferably from about 1% to about 50% of the monomer or monomers, other than the water-soluble amino alcohol compound, is added in the initial charge to the reactor, most preferably from about 8% to about 35%. The continuous addition of any reaction ingredient or ingredients is generally done over a period of from about 2 to about 4 hours. The delayed addition of protective colloid or the water-soluble amino alcohol compound along with either batch or delayed initiator addition may be used, although these variations are not necessary for the success of this invention. Indeed, the simple inclusion of the amino alcohol compounds in the initial reactor charge is sufficient for the success of this invention, regardless of the method of addition of the rest of the reaction components.

In general, the monomers are polymerized in aqueous emulsion at from about 45° C. to about 95° C. in the presence of a free radical polymerization initiator, particularly a water-soluble peroxide, e.g., hydrogen peroxide, persulfates such as potassium, sodium and ammonium persulfates or in some cases perborates. Other methods known in the art may also be used to polymerize the acrylic monomers.

The exact mechanism by which the water-soluble amino alcohol compounds provide low viscosity, stable latices in the presence of protective colloids is not known. However, it is theorized that the grafting reactions of acrylic ester and/or methacrylic monomers onto the protective colloid are reduced in the presence of the water-soluble amino alcohol compounds and that this reduction in grafting produces lower viscosity. This reduction in grafting also prevents agglomeration of the dispersion since the agglomerated particles most likely come about via the bridging of latex particles which is the result of grafting between the acrylic ester and/or methacrylic ester monomer and the protective colloid.

All parts and percentages used in this specification are by weight unless otherwise indicated.

The following examples are illustrative of this invention.

EXAMPLE 1

This example illustrates one embodiment of the aqueous polyacrylate dispersions of this invention and how to prepare same.

A reaction vessel equipped with a stirrer, reflux condenser, thermometer, one feed port and a water jacket is charged with 49.65 parts distilled water, 1 part octylphenol ethoxylate containing 10 moles of ethylene oxide, 0.15 parts sodium dodecyl benzene sulfonate, 0.5 parts triethanolamine, 0.5 parts hydroxyethyl cellulose having a Brookfield viscosity of 93 cps in a 5% aqueous solution at 25° C. and a hydroxyethyl molar substitution (M.S.) of 2.5 (M.S. is the average number of moles of a substitutent group per anhydroglucose unit of the cellulose molecule), and 10 parts of a monomer mixture containing, by weight, 42.7 parts butyl acrylate, 56.8 parts methyl methacrylate, and 0.5 parts methacrylic acid. Stirring is continuous throughout the reaction. The temperature of the reactor is raised to 85° C. via circulating hot water, 2.0 parts of a 5% aqueous solution of potassium persulfate is added batchwise and the addition of 34 parts of the above monomer mixture is started and continued uniformly over 2.5 hours. After one-half of the total monomer feed has been added, 2.0 parts of a 5% aqueous solution of potassium persulfate is added batchwise. The reaction temperature is maintained at 85° C. for 2 hours after the addition of the monomer feed. The reaction mixture is then cooled by circulating cold water.

EXAMPLE 2

This example illustrates another embodiment of this invention.

The procedure and formulation of Example 1 are used except that 1.0 parts of the hydroxyethyl cellulose is used instead of 0.5 parts.

EXAMPLE 3

This example illustrates another embodiment of this invention.

A reaction vessel equipped with a stirrer, reflux condenser, thermometer, one feed port and a water jacket is charged with 50.35 parts distilled water, 1.15 parts rosin amine ethoxylate containing 12 moles of ethylene oxide, 0.1 part hydroxyethyl cellulose having a Brookfield viscosity of 93 cps in a 5% aqueous solution at 25° C. and hydroxyethyl M.S. of 2.5, and 10 parts of a monomer mixture containing, by weight, 42.7 parts butyl acrylate, 56.8 parts methyl methacrylate, and 0.5 parts methacrylic acid. Stirring is continuous throughout the reaction. The temperature of the reactor is raised to 85° C. via circulating hot water, 4.0 parts of a 5% aqueous solution of potassium persulfate is added batchwise and the addition of 34 parts of the above monomer mixture is started and continued uniformly over 2.5 hours. The reaction temperature is maintained at 85° C. for 2 hours after the addition of the monomer feed. The reaction mixture is then cooled by circulating cold water.

EXAMPLE 4

This example illustrates another embodiment of this invention.

A reaction vessel equipped with a stirrer, reflux condenser, thermometer, one feed port and a water jacket is charged with 51.50 parts distilled water, 0.5 parts rosin amine ethoxylate containing 12 moles of ethylene oxide, 0.5 parts rosin (WG wood rosin from Hercules Incorporated), 0.5 parts hydroxyethyl cellulose having a Brookfield viscosity of 93 cps in a 5% aqueous solution at 25° C. and a hydroxyethyl M.S. of 2.5, 3.0 parts of a 5% aqueous solution of potassium persulfate, and 10 parts of a monomer mixture containing, by weight, 42.7 parts butyl acrylate, 56.8 parts methyl methacrylate, and 0.5 parts methacrylic acid. Stirring is continuous throughout the reaction. The temperature of the reactor is raised to 85° C. via circulating hot water. The addition 34 parts of the above monomer mixture are started and continued uniformly over 2.5 hours. The reaction temperature is maintained at 85° C. for 2 hours after the additions are complete. The reaction mixture is then cooled by circulating cold water.

It the above example the rosin amine ethoxylate acts as as a stabilizer and as the cationic surfactant. The rosin acid acts as an anionic surfactant.

COMPARATIVE EXAMPLE 5

This example illustrates the preparation of aqueous polyacrylate dispersions in the absence of a water-soluble amino alcohol compound of this invention.

The procedure and formulation of Example 1 are used except that 0.5 parts triethanolamine is omitted.

COMPARATIVE EXAMPLE 6

This example illustrates the preparation of aqueous polyacrylate dispersions in the absence of a water-soluble amino alcohol compound of this invention and in the absence of a protective colloid.

The procedure and formulation of Example 1 are used except that the 0.5 parts hydroxyethyl cellulose and 0.5 parts triethanolamine are omitted.

COMPARATIVE EXAMPLE 7

This example illustrates another preparation of aqueous polyacrylate dispersions in the presence of an aliphatic amine having no alcohol functionality.

The procedure and formulation of Example 1 are used except that 0.5 parts of cyclohexylamine is used instead of 0.5 parts triethanolamine.

COMPARATIVE EXAMPLE 8

This example illustrates another preparation of aqueous polyacrylate dispersions in the presence of an aliphatic alcohol having no amine functionality.

The procedure and formation of Example 1 are used except that 1.0 parts of isopropanol is used instead of 0.5 parts triethanolamine.

COMPARATIVE EXAMPLE 9

This example illustrates another preparation of aqueous polyacrylate dispersions in an aliphatic alcohol having no amine functionality.

The procedure are formulation of Example 1 are used except that 2.0 parts of alpha-methyl benzylalcohol is used instead of 0.5 parts triethanolamine.

Only when the amount of alcohol having no amine functionality is twice the amount shown in comparative example 9, do the resultant latices have acceptable viscosities.

The properties of the aqueous polyacrylate dispersions of Examples 1-4 and of comparative Examples 5-9 are set forth in the following Table I.

TABLE I

| Example | pH | Solids, Wt. % | Viscosity, cps[1] Before | Viscosity, cps[1] After | Particle Size, microns[2] Before | Particle Size, microns[2] After | Shear Stability[3] |
|---|---|---|---|---|---|---|---|
| 1 | 6.0 | 46 | 1560 | 50 | 2.7 | 0.75 | Yes |
| 2 | 6.4 | 46 | 5200 | 250 | 2.1 | 0.67 | Yes |
| 3 | 4.6 | 46 | 1520 | 72 | 3.3 | 0.82 | Yes |
| 4 | 3.7 | 46 | 220 | 84 | 2.7 | 1.0 | Yes |
| 5 | 2.8 | 36 | coagulated | — | 4.0 | — | Yes |
| 6 | 2.8 | 46 | 40 | coagulated | 0.11 | — | No[4] |
| 7 | 6.0 | 46 | 1820 | 30 | 2.11 | 0.66 | Yes |
| 8 | 2.8 | 48 | 5700 | — | 4.0 | — | Yes |
| 9 | 2.7 | 48 | 6100 | — | 1.0 | — | Yes |

[1]Brookfield viscosity at 25° C. Wherever possible a viscosity reading is provided before and after shearing the sample in a Waring blender for 10 minutes at the highest speed.
[2]Coulter Nanosizer. Wherever possible a particle size reading is provided before and after shearing the sample in a Waring blender for 10 minutes at the highest speed.
[3]Ten minutes in a Waring blender at the highest speed.
[4]Failed after 10 seconds.

EXAMPLE 10

The example illustrates the use of the polyacrylate latices of this invention in flat latex paint formulations and how to prepare them.

The latex paint is prepared by charging a Cowles disperser with the first 13 ingredients set forth below in Table II and mixing and grinding at high speed for 20 minutes. The remaining 3 ingredients of Table II are then added to the disperser and the mixture is ground at medium speed for 20 minutes.

TABLE II

| Ingredients | Parts by Weight |
|---|---|
| Distilled water | 444.5 |
| Potassium tripolyphosphate | 2.0 |
| Lecithin | 2.0 |
| Aqueous diisobutylene-maleic acid copolymer, Na salt (25% solids) | 5.0 |
| Defoamer 501 hydrophobic surface-modified silica** | 2.0 |
| Ethylene glycol | 20.0 |
| Diethylene glycol monobutyl ether acetate | 10.0 |
| Titanium dioxide, paint grade | 175.0 |
| Calcium carbonate | 150.0 |
| Iceberg clay | 125.0 |
| Silica, 3 microns average particle size; 99.5% SiO$_2$ | 25.0 |
| Nonylphenoxy polyethyleneoxyethanol (10) | 3.0 |
| Hydroxyethyl cellulose having a 2.5 M.S. | 5.5 |
| Bromobenzylacetate | 0.5 |
| Latex of Example 1* | 94.0 |
| Distilled water | 56.0 |

*Based on 48% solids latex. The amount of wet latex and water added during the let-down stage will vary according to the weight percent latex solids. All latexes are formulated to 45 g dry latex solids.
**Available from Hercules Incorporated.

EXAMPLES 11-17

These examples illustrate other embodiments of this invention.

The procedure and formulation of Example 10 are used except that the latex of Examples 2, 3, 4, 5, 6, 7 and 9, respectively, are used in Examples 11-17 instead of the latex of Example 1.

The properties of the latex formulations of Examples 10-17 are set forth in Table III below:

TABLE III

| Example | Abrasion Resistance[1], Cycles to Failure |
|---|---|
| 10 | 65-70 |
| 11 | 45-50 |
| 12 | 60-70 |
| 13 | 40-45 |
| 14 | 20-25 |
| 15 | 46-50 |
| 16 | 40-42 |
| 17 | 45-50 |

[1]Represents scrub cycles to failure of 78 PVC flat paint films after 4 days aging formulated with the respective latex according to ASTM D-2486-74a.

Thus this invention provides low viscosity, essentially grit free and shear stable acrylic latices having improved pigment binding which can be formulated into latex paints having good abrasion resistance, binders for nonwoven materials, water-based inks, paper coatings and into water-borne adhesives.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What I claim is:

1. A process for preparing an acrylic polymer latex by the aqueous emulsion polymerization of an acrylic ester, a methacrylic ester or mixtures thereof, and, optionally, a minor amount of a comonomer, in the presence of a protective colloid and a free radical polymerization initiator, wherein the improvement consists essentially of adding to the polymerization reaction mixture from about 0.1% to 5%, by weight of the total monomer, of a water-soluble amino alcohol compound.

2. The process of claim 1 wherein the water-soluble amino alcohol compound is selected from the group consisting of amino alcohol compounds having from 2 to 36 carbon atoms, the alkylene oxide polycondensates derived therefrom, rosin amines, and the inorganic and organic acid salts thereof.

3. The process of claim 1 wherein the protective colloid is present in an amount of from 0.05% to about 5%.

4. The process of claim 3 wherein the protective colloid is selected from the group consisting of hydroxyethyl cellulose, ethylhydroxyethyl cellulose, carboxymethyl cellulose, ethoxylated starch derivatives, partially and fully hydrolyzed polyvinyl alcohols, polyacrylic acid, sodium and other alkali metal polyacrylates, polyacrylamide, poly(methylvinyl ether-maleic anhydride), polyvinylpyrrolidone, water-soluble starch, glue, gelatin, water-soluble alginates, casein, agar and natural and synthetic gums.

5. The process of claim 1 wherein the acrylic ester is selected from the group consisting of alkyl acrylates wherein the alkyl group contains less than 10 carbon atoms.

6. The process of claim 1 wherein the methacrylic ester is selected from the group consisting of alkyl methacrylates wherein the alkyl group contains less than 10 carbon atoms.

7. The process of claim 1 wherein the comonomer is present in an amount of from about 0.5% to about 25%.

8. The process of claim 1 wherein (A) (i) all of the water-soluble amino alcohol compound and (ii) from about 1% to about 50% of the monomer mixture is added in the initial reaction charge, (B) the free radical polymerization initiator is added, and (C) the remainder of the monomer mixture is then added continuously over a period from about 2 to about 4 hours, and (D) the reaction continued until polymerization is complete.

9. The process of claim 1 wherein (A) (i) all of the water-soluble amino alcohol compound, (ii) from about 1% to about 50% of the monomer mixture (iii) the free radical polymerization initiator is added in the initial reaction charge, and (B) the remainder of the monomer mixture is then added continuously over a period from about 2 to about 4 hours and (C) the reaction continued until polymerization is complete.

10. The process of claim 8 wherein the water-soluble amino alcohol compound is selected from the group consisting of amino alcohol compounds having from 2 to 36 carbon atoms, the alkylene oxide polycondensates derived therefrom, rosin amines, and the inorganic and organic acid salts thereof.

11. The process of claim 9 wherein the water-soluble amino alcohol compound is selected from the group consisting of amino alcohol compounds having from 2 to 36 carbon atoms, the alkylene oxide polycondensates derived therefrom, rosin amines, and the inorganic and organic acid salts thereof.

12. The product produced by the process of claim 1.
13. The product produced by the process of claim 8.
14. The product produced by the process of claim 9.

* * * * *